United States Patent
Morovic et al.

(10) Patent No.: US 10,688,724 B2
(45) Date of Patent: Jun. 23, 2020

(54) SETTING PROPERTIES OF THREE-DIMENSIONAL OBJECTS

(71) Applicant: Hewlett-Packard Development Company, L.P., Houston, TX (US)

(72) Inventors: Jan Morovic, Colchester (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 350 days.

(21) Appl. No.: 15/546,193

(22) PCT Filed: Apr. 24, 2015

(86) PCT No.: PCT/EP2015/058939
§ 371 (c)(1),
(2) Date: Jul. 25, 2017

(87) PCT Pub. No.: WO2016/169620
PCT Pub. Date: Oct. 27, 2016

(65) Prior Publication Data
US 2018/0022030 A1     Jan. 25, 2018

(51) Int. Cl.
*B29C 64/386*     (2017.01)
*B33Y 50/00*      (2015.01)
(Continued)

(52) U.S. Cl.
CPC .......... *B29C 64/386* (2017.08); *B33Y 50/00* (2014.12); *G05B 19/4099* (2013.01); *B33Y 50/02* (2014.12);
(Continued)

(58) Field of Classification Search
CPC ....... B29C 64/386; B33Y 50/00; B33Y 50/02; G05B 19/4099; G05B 2219/35134; G05B 2219/49023
(Continued)

(56) References Cited

U.S. PATENT DOCUMENTS 7,456,842 B2   11/2008  Kosolapov
7,910,193 B2   3/2011   Ma
(Continued)

FOREIGN PATENT DOCUMENTS

CN       101814188        8/2010
WO    WO 2013/113372      8/2013
(Continued)

OTHER PUBLICATIONS

Bustos, Benjamin, et al., "Feature-Based Similanty Search in 3D Object Databases", ACM Computing Surveys, vol. 37, No. 4, Dec. 2005, pp. 345-387.
(Continued)

*Primary Examiner* — Joseph S Del Sole
*Assistant Examiner* — Lawrence D. Hohenbrink, Jr.
(74) *Attorney, Agent, or Firm* — Dierker & Kavanaugh PC

(57) ABSTRACT

A method for setting properties of a three-dimensional object in an additive manufacturing process, e.g. 3D-Printing, in which data representing a three-dimensional object to be printed is obtained. The data comprises sub-volumes representing the three-dimensional object. The position of the sub-volumes in the three-dimensional object is identifyied by a positional pomponent, i.e. a location depth and an orientation angle. A characteristic for the three-dimensional object to be printed is identified or set by the user. The property data is set for individual sub-volumes to be used in printing the three-dimensional object based on the identified characteristic and positional component. The property data comprises material property data, structural property data and printing property data.

15 Claims, 3 Drawing Sheets

(51) Int. Cl.
    *G05B 19/4099*    (2006.01)
    *B33Y 50/02*      (2015.01)
(52) U.S. Cl.
    CPC .............. *G05B 2219/35134* (2013.01); *G05B 2219/49023* (2013.01)
(58) Field of Classification Search
    USPC .......................................... 264/308; 425/375
    See application file for complete search history.

(56) References Cited

U.S. PATENT DOCUMENTS

| | | |
|---|---|---|
| 2013/0053995 A1 | 2/2013 | Hashimoto et al. |
| 2014/0107823 A1 | 4/2014 | Huang |
| 2015/0045924 A1 | 2/2015 | Cluckers et al. |

FOREIGN PATENT DOCUMENTS

| | | | |
|---|---|---|---|
| WO | WO-2013113372 A1 | * | 8/2013 |
| WO | WO 2014/015994 | | 1/2014 |

OTHER PUBLICATIONS

International Search Report and Written Opinion for International Application No. PCT/EP2015/058939 dated Apr. 8, 2016, 15 pages.
Hiller, Jonathan, et al. "Tunable Digital Material Properties for 3D Voxel Printers", Mechanical and Aerospace Engineering Cornell University Sep. 2008, XP002694093, pp. 33-44.
Stank, M.; et al., "Color and Permanence Issues in 3D Ink-jet Printing", MIPRO 2010, (2010), 4 pages.

* cited by examiner

SETTING PROPERTIES OF THREE-DIMENSIONAL OBJECTS

BACKGROUND

Three-dimensional objects generated by an additive manufacturing process may be formed in a layer-by-layer manner. In one example of additive manufacturing, an object is generated by solidifying portions of layers of build material in an apparatus. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used, which may not need the application of energy to solidify. For example, three-dimensional objects may be generated by using extruded plastics or sprayed materials as build materials, which solidify to form an object.

BRIEF DESCRIPTION OF DRAWINGS

For a more complete understanding, various examples will now be described below with reference to the accompanying drawings in which.

DETAILED DESCRIPTION

Figure 1:
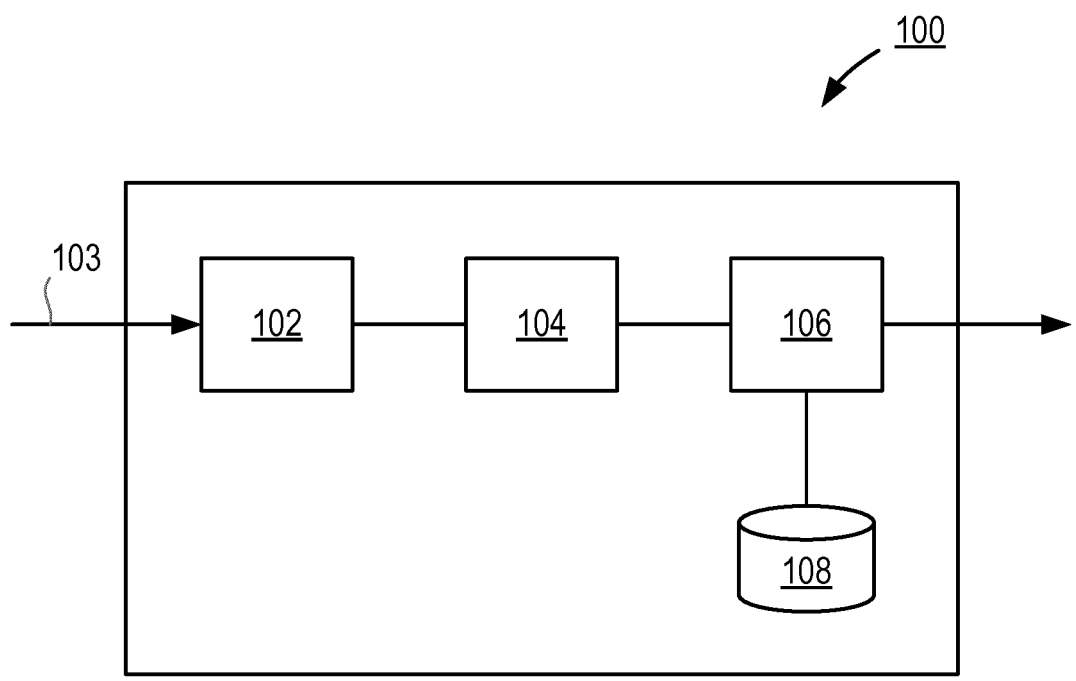
FIG. 1 is a block diagram of an example apparatus which makes use of the present disclosure.

Some examples described herein provide an apparatus and a method for setting properties of a three-dimensional object that may be used to produce the three-dimensional object. Some examples allow arbitrary three-dimensional content with a variety of specified object properties to be processed and used to generate a three-dimensional object. These object properties may comprise appearance properties and/or mechanical properties such as colour, transparency, glossiness, strength, conductivity, density, porosity, etc.

In some examples herein, three-dimensional space is characterised in terms of sub-volumes. The sub-volumes may be in the form of "voxels", i.e. three-dimensional pixels, wherein each voxel occupies a discrete volume. However, it will be understood that the sub-volume may be any volumetric entity that may take any shape (for example, cubic, cuboid, tetrahedron, or any other shape). In data modelling a three-dimensional object, a sub-volume at a given location may have at least one property. For example, it may be empty, it may have a particular colour, it may represent a particular material, it may represent a particular structural property, and/or the like.

In some examples, data representing a three-dimensional object is processed to set properties to be used in generating the object.

In some examples, a material volume coverage representation defines print material data, for example detailing the amount of print materials (such as agent(s) to be deposited onto a layer of build material, or in some examples, build materials themselves), and, if applicable, their combinations. In some examples, this may be specified as a proportional volume coverage (for example, X % of a region of a layer of build material should have agent Y applied thereto). Such print materials may be related to or selected to provided an object property such as, for example, colour, transparency, flexibility, elasticity, rigidity, surface roughness, porosity, conductivity, inter-layer strength, density, and the like.

The actual location at which each print material (for example, a drop of an agent) should be applied may be determined using halftoning techniques.

For example, a set of sub-volumes within object model data may have an associated set of material volume coverage (Mvoc) vectors. In a simple case, such a vector may indicate that X % of a given region of three-dimensional space should have a particular agent applied thereto, whereas (100-X) % should have no agent applied thereto. The material volume coverage representation may then provide the input for a halftoning process to generate control data that may be used by an additive manufacturing system to produce a three-dimensional object. For example, it may be determined that, to produce specified object properties, 25% of a layer of build material (or of a portion of a layer) should have an agent applied thereto. The halftoning process determines where the drops of agent should be deposited in order to provide 25% coverage, for example, by comparing each location to a threshold value provided in a halftone threshold matrix. In another case, there may be two agents and the volume coverages of each of them, of their combination and of the volume left clear may be directly determined.

It may be the case that, at the time the 3D data model is constructed, a print apparatus to be used to print the object is unspecified, at least in terms of its capabilities.

The present subject-matter is further described with reference to FIGS. 1, 2 and 3. It should be noted that the description and figures merely illustrate principles of the present subject-matter. It is thus understood that various arrangements may be devised that, although not explicitly described or shown herein, embody the principles of the present subject-matter. Moreover, all statements herein reciting principles and examples of the present-subject matter, as well as specific examples thereof, are intended to encompass equivalents thereof.

FIG. 1 is an apparatus 100 according to an example of the present subject-matter. The apparatus 100 comprises an obtaining module 102 to obtain data 103 representing a three-dimensional object, an identifying module 104 to identify data, a processor 106 to process data and a machine-readable storage 108 to store data. The machine-readable storage 108 may store data for access by an application program being executed by the processor 106 and may comprise a data structure including information for use by the application program. The machine-readable storage 108 may be any electronic, magnetic, optical or other physical storage device that stores executable instructions. Thus, machine-readable storage 108 may be, for example, a Random Access Memory (RAM), an Electrically-Erasable Programmable Read-Only Memory (EEPROM), a storage drive, an optical disc or the like. The machine-readable storage 108 may be encoded with executable instructions.

Figure 2:
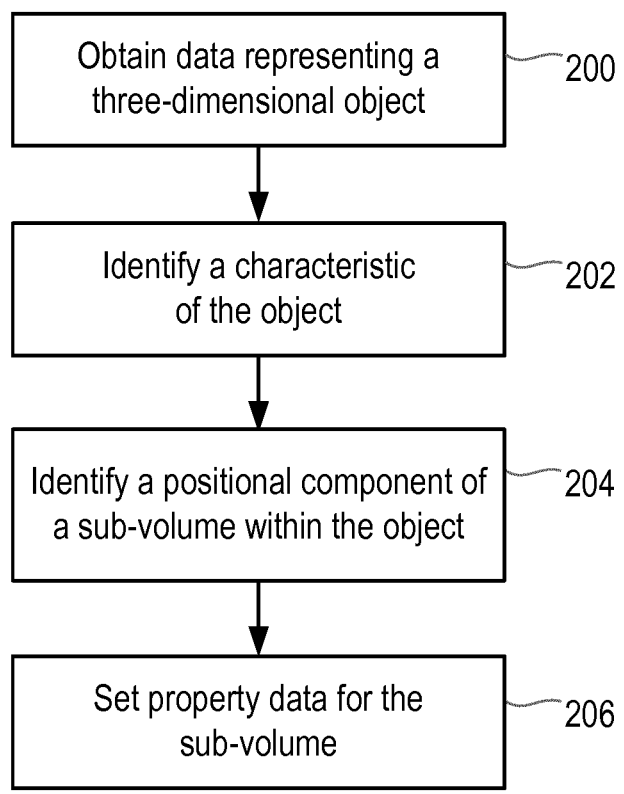
FIG. 2 is a flowchart of an example of a process which may be employed according to the present disclosure.

FIG. 2 is a flowchart of an example of a process which may be employed according to the present disclosure and will now be described also with reference to FIG. 1.

At block 200, the obtaining module 102 obtains data representing a three-dimensional object to be printed. The data may comprise geometric information of the three-dimensional model to be printed in the form of sub-volumes that represent or make up the three-dimensional object. The sub-volumes may be in the form of an array with each sub-volume being located at a unique three-dimensional location within the three-dimensional object.

At block 202, the identifying module 104 identifies or obtains a characteristic for the three-dimensional object to be printed. In one example, the identified characteristic for the three-dimensional object to be printed may be identified from a user input received at a user interface (not shown). The user input may indicate or specify the characteristic. The identified characteristic may include information about the properties that the three-dimensional object is to have once it has been produced or printed. For example, the identified characteristic for the three-dimensional object may include information or values in respect of elasticity, weight, opacity, ductility, flexibility, colour, conductivity, rigidity, surface roughness, porosity, strength, and/or any other characteristic. In one example, the identifying module 104 may identify a particular value for the weight and a particular value for the elasticity of the three-dimensional object. The identifying module 104 may identify different characteristics for different portions or partial volumes of the three-dimensional object. For example, the identifying module 104 may identify one characteristic or set of characteristics for the interior of the three dimensional object and another characteristic or set of characteristics for the exterior or surface of the three-dimensional object, etc.

At block 202, the identifying module 104 also identifies a positional component of a sub-volume within the three-dimensional object. The positional component may be a depth at which the sub-volume is located within the three-dimensional object. The depth may be defined as the distance that the sub-volume is located from the surface of the three-dimensional object. Alternatively or additionally, the positional component may be an angle at which the sub-volume is orientated within the three-dimensional object. For example, the angle at which the sub-volume is orientated may be the angle between a surface normal at the sub-volume and a printing direction.

Figure 3:
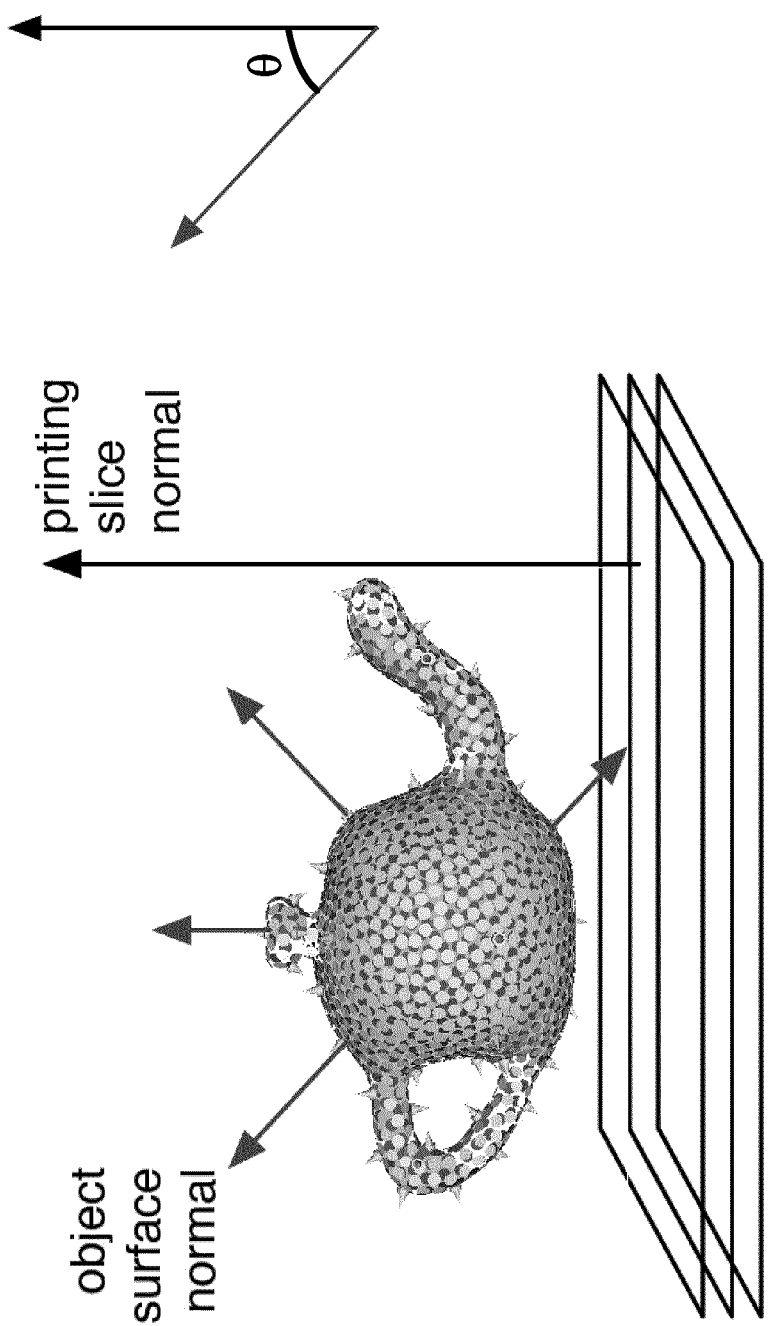
FIG. 3 is an illustration of an example positional component for a three-dimensional object according to the present disclosure.

FIG. 3 provides an example illustration of a positional component. In FIG. 3, the positional component is an angle $\theta$ between an object surface normal at a sub-volume and a printing direction or a printing slice normal (i.e. the direction in which layers are printed for the three-dimensional object).

Although some examples of positional component are provided above, it will be understood that the positional component can be any other positional component or any combination of positional components.

At block 204, based on the identified characteristic and positional component, the processor 106 sets property data for the sub-volume to be used in printing the three-dimensional object. The property data may include material property data, structural property data and/or printing property data. It will be understood that the property data may also include other types of data.

The material property data may, for example, include information on the use of materials (such as build materials and/or agents to be deposited onto build materials). For example, the material property data may include data indicating material quantity, material weight, material density, material distribution, material combination (for example, the combination of build materials and agents, the combination of build materials themselves, etc), material volume coverage (Mvoc) information or vectors (as described earlier), colour information and/or any other material property data. The structural property data may, for example, include information on the distribution of materials. For example, the structural property data may include data indicating structural size, structural shape, halftoning information (such as a choice of algorithm, resources, etc) and/or any other structural property data. The printing property data may, for example, include information on the settings to use for the printing system. For example, the printing property data may include data indicating a printing process, a printing technique, a printing speed, a fusing temperature, an instruction to set different material property data and/or structural property data (for example, depending on the availability of materials and/or structures supported) and/or any other printing property data.

The characteristic and the positional component identified by the identifying module 104 is a function of property data according to the present disclosure. For example, the processor 106 can map the characteristics and the positional components identified by the identifying module 104 to property data. An example is that the characteristics may be in the form of characteristic vectors $\overline{P}$. A characteristic vector $\overline{P}$ can have as many dimensions as there are independent characteristics. For example, the identifying module 104 may identify a characteristic indicating a conductivity C and an elasticity E. In this example, a sub-volume v can be associated with a two-dimensional characteristic vector $P_v = (C_v, E_v)$. The positional components may be mapped to property data in the same way.

According to the present disclosure, property data can be varied depending on the positional components of a sub-volume in order to provide identified characteristics. For example, a set of sub-volumes may have the same specification and thus the processor 106 may provide the identified characteristics by appropriately varying property data (for example, material volume coverage Mvoc) in the sub-volumes based on the positional component of those sub-volumes. The processor 106 may vary the property data relative to a writing system of a three-dimensional printer used for printing the three-dimensional object or relative to the three-dimensional object being printed. It will be understood that other examples are also possible.

In one example, the identifying module 104 may identify a positional component as an orientation angle $\theta$ for the sub-volume. The identified orientation angle $\theta$ may be, for example, an angle between the object surface normal at the sub-volume with respect to a printing plane normal (i.e. the axis along which subsequent layers are to be printed). This is illustrated in FIG. 3. In the same example, the identifying module 104 may identify a characteristic as colour information in the form of RGB data. In this example, in processing terms, the identified positional component and characteristic may be expressed as [$\theta$, RGB].

The processor 106 can set property data (for example, material volume coverage Mvoc data) as a function of both the RGB colour data and the orientation angle $\theta$. The processor 106 may first identify the number n of orientation angles $\theta$ for which custom characteristic to property data (in this example, custom RGB colour to material volume coverage Mvoc data) mappings need to be determined.

The processor 106 may start from a larger than anticipated number of angles for which material volume coverages Mvocs are printed and their colours measured. The processor 106 may then analyse the angle-colour relationship to obtain the smallest number of angles that need to be characterised directly to enable the angle-colour relationship for intermediate angles to be accurately predicted from those angles and may perform a suitable interpolation between them. In other words, the processor 106 may interpolate intermediate angles from those for which the processor 106 has directly characterised an angle-colour relationship.

The interpolation may be a linear interpolation, or some form of non-linear interpolation. For example, the processor 106 may use a piecewise linear interpolation (i.e. linear interpolation between the nearest smaller and greater angles) or may use any other interpolation technique such as cubic splines. The processor 106 may determine which interpolation technique to use as part of identifying the smallest number of angles mentioned above. The processor 106 may make this determination based on a predetermined level of accuracy since the choice of angles and interpolation technique will provide a given level of accuracy.

The interpolation may result in a case where end-points and a functional relationship are established. For example, end-points and a gamma function that models the orientation angle θ and the colour (RGB) data. In one example, it may be the case that extreme angles (for example, angles of 0 and 180 degrees) may be used. In this example, the processor 106 may apply a non-linear function for interpolating between the angles. The gamma function may be computed to minimise error versus colour measurements.

For each identified orientation angle θ, the processor 106 may determine a separate characteristic to property data mapping (in this example, a separate RGB colour to material volume coverage Mvoc data mapping). The processor 106 may determine the mapping via a look-up table (LUT), which will be described in more detail later. The processor 106 may combine the n three-dimensional (RGB) indexed LUTs into a single four-dimensional (θ−RGB) indexed LUT.

The identifying module 104 may identify more than one positional component. For example, in addition to an orientation angle θ for the sub-volume, the identifying module 104 may identify a depth for the sub-volume within the three-dimensional object. In an example where the identifying module 104 identifies a characteristic as colour information in the form of RGB data, the identified positional component and characteristic may be expressed as [θ, depth, RGB], in processing terms.

The processor 106 may process any number of identified positional components and characteristics in any combination. In one example, the processor 106 may process identified data having two positional components in combination with six characteristics such as [depth, theta; RGB, opacity, ductility, flexibility]. However, although examples have been provided here, it will be understood that any other positional components and characteristics may be identified and may be indentified in various different combinations.

According to the present disclosure, the processor 106 may set property data in such a way that sub-volumes will have consistent characteristics irrespective of their location within the three-dimensional object.

In some examples, the processor 106 may associate a target set of characteristics to each sub-volume that is to be printed (i.e. to each printing sub-volume). The process that the processor 106 employs to set characteristics in this way may depend on how characteristics have been specified, for example, by a user at a user interface. For example, the processor 106 may first compute target sub-volumes from input sub-volumes, assign those target sub-volumes their target set of properties, and then further subdivide the target sub-volumes into printing sub-volumes. The processor 106 may then identify the positional components of those printing sub-volumes.

The processor 106 may set property data (including material property data, structure property data and printing property data) for each printing sub-volume based on the target set of characteristics and positional components for that sub-volume. In other examples, the processor 106 may set property data for a predetermined number of printing sub-volumes (for example, a predetermined set of printing sub-volumes) based on the target set of characteristics and positional components for those sub-volumes. In this example, the processor 106 may assign other sub-volumes (for example, those outside the predetermined set) with random property data, default property data, or may leave them empty, etc.

Although some property data is controllable (and thus can be set) by the processor 106 at the sub-volume level, there may be some property data that the processor 106 needs to establish for a layer of sub-volumes (for example, the printing speed) and some property data that the processor 106 needs to control globally (for example, the choice of powder onto which agents are deposited or the temperature at which the printing bed is maintained).

In some examples, the processor 106 may set property data for sub-volumes to be different for adjacent sub-volumes depending on the identified characteristics and positional components for the sub-volumes. For example, the sub-volumes representing the three-dimensional object may comprise surface sub-volumes that represent or define a surface of the three-dimensional object and interior sub-volumes that represent or define an interior volume of three-dimensional object. In this example, the processor 106 may set property data for surface sub-volumes and property data for interior sub-volumes differently or to be different. For example, where the characteristics and/or sub-volume positional components for interior and exterior portions of the three-dimensional object (as discussed earlier) are different.

In some examples, the processor 106 may set property data for sub-volumes in a partial volume of the three-dimensional object. For example, as discussed earlier, the identifying module 104 may identify a characteristic for a partial volume of the three-dimensional object (for example, a partial volume may have been indicated at a user interface) and then may identify positional components of the sub-volumes within the partial volume. The processor 106 may then set property data for sub-volumes in that partial volume. In some examples, the processor 106 may set property data for sub-volumes in one partial volume differently or to be different from sub-volumes in another partial volume (depending on the identified characteristics and/or sub-volume positional components for those partial volumes).

The processor 106 may encode the property data as a tuple. For example, a tuple that describes the structural property data ($\overline{S}$), the material property data ($\overline{M}$) and the printing property data ($\overline{\Pi}$) may be expressed as ($\overline{S}, \overline{M}, \overline{\Pi}$).

The machine-readable storage 108 may store property data (such as material property data, structural property data and/or printing property data) for sub-volumes as a function of three-dimensional object characteristics and sub-volume positional components. The machine-readable storage 108 may be preconfigured with this information. Alternatively, or in addition, the machine-readable storage 108 may passively learn this information based on the information that is obtained through use of the apparatus 100 over time.

The processor 106 may retrieve from the machine-readable storage 108 the property data for the sub-volumes that most closely or exactly provide the target set of characteristics associated with those sub-volumes having the identified positional components. The processor 108 will then set those sub-volumes with the property data retrieved for them. In this way, a three-dimensional object that may subsequently be produced or printed with sub-volumes having that property data and the identified positional components will have the identified characteristic.

As an example of the storage of data, the machine-readable storage 108 may store the property data (such as material property data, structural property data and/or printing property data) as a function of three-dimensional object characteristics and sub-volume positional components in the form of a look-up table (LUT). The LUT may map three-dimensional object characteristics and sub-volume positional components to property data. For example, the LUT may map three-dimensional object characteristics and sub-volume positional components to various combinations of material property data, structural property data and printing property data.

In the vector form mentioned earlier, the LUT may map characteristic vector $\overline{P}$ to the tuple $(\overline{S}, \overline{M}, \overline{\Pi})$ that describes the structural property data $(\overline{S})$, the material property data ($\overline{M}$) and the printing property data $(\overline{\Pi})$. In mathematical form, this can be expressed as $\overline{P} \rightarrow (\overline{S}, \overline{M}, \overline{\Pi})$. In a similar manner, the LUT may map the identified sub-volume positional components and characteristic vectors to property data. For example, where an identified sub-volume positional component is an orientation angle θ, the characteristic vectors are RGB colour data and the property data is material volume coverage Mvoc data, then the orientation angle θ and the RGB colour data may be mapped to the material volume coverage Mvoc data, which can be expressed as (θ,RGB)→Mvoc. In this way, the processor 106 is able to find the mapping for characteristic vectors and the sub-volume positional components that are present in the machine-readable storage 108.

The processor 106 may also have a mechanism for finding the mapping for characteristic vectors and sub-volume positional components that are not present in the machine-readable storage 108. For example, the processor 106 may perform a tetrahedral interpolation for the volumetric distribution of materials to determine the mapping for characteristic vectors and sub-volume positional components that are not present in the machine-readable storage 108.

Once the processor 106 has set the sub-volume level properties in any of the above described ways, the processor 106 has the data that will produce a three-dimensional object having the identified characteristics and sub-volume positional components. For example, given a three-dimensional object to print, the processor 106 may, for each sub-volume of the object, use the identified positional components and characteristics for the sub-volume to obtain and set object property data that can be used in printing.

In one example, given a three-dimensional object to print, the processor 106 may compute the surface normals of the object. For each sub-volume of the object, the processor 106 may use the surface normal's angle with the printing slice normal and the RGB colour data specified for it to compute a material volume coverage Mvoc from an LUT. For a given RGB and the theta angle of the sub-volume for which it specifies colour, the LUT may allow for the interpolation of an Mvoc that will result in that colour given the position of the sub-volume relative to a printing slice normal. The processor 106 may then halftone and print the resulting material volume coverages Mvocs.

The processor 106 may instruct the apparatus 100 to produce or print the three-dimensional object using the property data set for the sub-volumes. The processor 106 may instruct the apparatus 100 to produce or print automatically after setting property data or may receive a user input indicating that production or printing should begin. The processor 106 may receive the user input instructing production or printing to begin at any stage in the process according to the present disclosure. For example, the processor 106 may receive the user input instructing production or printing to begin once the processor 106 has set the property data for the sub-volumes representing the three-dimensional object to be printed or at any other stage during the process according to the present disclosure. The processor 106 may provide the data to another apparatus, device or system (not shown) for object production or printing.

Examples in the present disclosure can be provided as methods, systems or machine-readable instructions, such as any combination of software, hardware, firmware or the like. Such machine-readable instructions may be included on a machine-readable storage medium (including but is not limited to disc storage, CD-ROM, optical storage, etc.) having machine-readable program code therein or thereon.

The present disclosure is described with reference to flow charts and/or block diagrams of the method, apparatus and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realised by machine-readable instructions.

The machine-readable instructions may, for example, be executed by a general purpose computer, a special purpose computer, an embedded processor or processors of other programmable data processing devices to realise the functions described in the description and figures. For example, a processing apparatus or processor, such as the processor 106, may execute the machine-readable instructions. Thus, functional modules of the apparatus and devices may be implemented by a processor executing machine-readable instructions stored in a memory, or a processor operating in accordance with instructions embedded in logic circuitry. The term "processor" is to be interpreted broadly to include a processing unit, central processing unit (CPU), application-specific integrated circuit (ASIC), logic unit, programmable gate array, etc. The methods and functional modules may all be performed by a single processor or divided amongst several processors.

Such machine-readable instructions may also be stored in a machine-readable storage, such as machine-readable storage 108, that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a means for realising functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit and scope of the present disclosure. It should be noted that the above-mentioned examples illustrate rather than limit what is described herein, and that those skilled in the art will be able to design many alternative implementations without departing from the scope of the appended claims. For example, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   obtaining data representing a three-dimensional object to be printed, the data comprising sub-volumes representing the three-dimensional object;
   identifying a characteristic for the three-dimensional object to be printed;
   identifying from the data, a positional component of a sub-volume within the three-dimensional object; and
   based on the identified characteristic and the identified positional component, setting property data for the sub-volume to be used in printing the three-dimensional object, wherein the identified characteristic and the identified positional component are a function of the property data.

2. A method according to claim 1 in which the identified positional component is a depth at which the sub-volume is located within the three-dimensional object.

3. A method according to claim 1 in which the identified positional component is an angle at which the sub-volume is orientated within the three-dimensional object.

4. A method according to claim 3 in which the angle at which the sub-volume is orientated is the angle between a surface normal of the sub-volume and a printing direction.

5. A method according to claim 1 comprising receiving a user input indicating the identified characteristic for the three-dimensional object to be printed.

6. A method according to claim 1 in which the property data comprises material property data, structural property data and printing property data.

7. A method according to claim 1 comprising storing, for sub-volumes, property data as a function of three-dimensional object characteristics and positional components.

8. A method according to claim 1 comprising printing the three-dimensional object using the property data for the sub-volume.

9. A method according to claim 6 wherein the material property data includes a data indicating a material quantity, a material weight, a material density, a material distribution, a material combination and/or material volume coverage information.

10. A method according to claim 6 wherein the structural property data includes data indicating a structural size, structural shape and/or halftoning information.

11. A method according to claim 6 wherein the printing property data includes data indicating a printing process, a printing technique, a printing speed, a fusing temperature and/or an instruction to set different material property data and/or structural property data.

12. A method according to claim 1 wherein the identified characteristic for the three-dimensional object to be printed includes elasticity, weight, opacity, ductility, flexibility, colour and/or a conductivity for the three dimensional object to be printed.

13. Apparatus comprising:
   an obtaining module to obtain data representing a three-dimensional object to be printed, the data comprising sub-volumes representing the three-dimensional object;
   an identifying module to identify a characteristic for the three-dimensional object to be printed and a positional component of a sub-volume within the three-dimensional object; and
   a processor to set, based on the identified characteristic and the identified positional component, property data for the sub-volume to be used in printing the three-dimensional object, wherein the identified characteristic and the identified positional component are a function of the property data.

14. An apparatus according to claim 13 comprising:
   a storage to store, for sub-volumes, property data as a function of three-dimensional object characteristics and positional components.

15. A non-transitory machine-readable storage medium encoded with instructions executable by a processor, the machine-readable storage medium comprising:
   instructions to obtain data representing a three-dimensional object to be printed, the data comprising sub-volumes making up the three-dimensional object;
   instructions to obtain a characteristic for the three-dimensional object to be printed and a positional component of a sub-volume within the three-dimensional object; and
   instructions to set, based on the obtained characteristic and the obtained positional component, property data for the sub-volume to be used in printing the three-dimensional object, wherein the obtained characteristic and the obtained positional component are a function of the property data.

* * * * *